(12) United States Patent
Ucar et al.

(10) Patent No.: US 11,916,736 B2
(45) Date of Patent: Feb. 27, 2024

(54) REORGANIZING AUTONOMOUS ENTITIES FOR IMPROVED VEHICULAR MICRO CLOUD OPERATION

(71) Applicant: Toyota Motor Engineering & Manufacturing North America, Inc., Erlanger, KY (US)

(72) Inventors: Seyhan Ucar, Mountain View, CA (US); Takamasa Higuchi, Mountain View, CA (US); Onur Altintas, Mountain View, CA (US); Kentaro Oguchi, Mountain View, CA (US)

( * ) Notice: Subject to any disclaimer, the term of this patent is extended or adjusted under 35 U.S.C. 154(b) by 700 days.

(21) Appl. No.: 16/387,518

(22) Filed: Apr. 17, 2019

(65) Prior Publication Data

US 2020/0336375 A1    Oct. 22, 2020

(51) Int. Cl.
*H04W 4/40* (2018.01)
*H04L 41/0823* (2022.01)
*G08G 1/00* (2006.01)
*G05D 1/00* (2006.01)
*H04L 67/10* (2022.01)

(52) U.S. Cl.
CPC ....... *H04L 41/0823* (2013.01); *G05D 1/0276* (2013.01); *G05D 1/0291* (2013.01); *G08G 1/22* (2013.01); *H04L 67/10* (2013.01); *H04W 4/40* (2018.02); *G05D 2201/0213* (2013.01)

(58) Field of Classification Search
CPC ...... H04L 41/0823; H04L 67/10; H04W 4/40; G05D 1/0276; G05D 1/0291; G05F 2201/0212; G08G 1/22

USPC ......................................................... 709/223
See application file for complete search history.

(56) References Cited

U.S. PATENT DOCUMENTS

| | | | |
|---|---|---|---|
| 2012/0108163 A1* | 5/2012 | Bai ...................... | H04L 12/189 455/3.06 |
| 2019/0132706 A1* | 5/2019 | Altintas ................. | H04W 4/40 |
| 2019/0208387 A1* | 7/2019 | Jiang ................... | H04W 72/044 |
| 2020/0313959 A1* | 10/2020 | Higuchi ................ | H04W 48/18 |

FOREIGN PATENT DOCUMENTS

JP    PO2018-189528    11/2018

* cited by examiner

*Primary Examiner* — Sibte H Bukhari
(74) *Attorney, Agent, or Firm* — Burbage Law, P.C.; Jon-Michael Burbage

(57) ABSTRACT

The disclosure includes embodiments for reorganizing autonomous entities to meet a resource demand of a vehicular micro cloud. In some embodiments, a method for a connected vehicle that is a member of the vehicular micro cloud includes modifying an operation of a communication unit of the connected vehicle to receive, via a Vehicle-to-Everything (V2X) network, a reorganization message that includes a reorganization instruction to fulfill the resource demand of the vehicular micro cloud. The method includes executing the reorganization instruction to incorporate one or more resources of an autonomous entity into a resource pool of the vehicular micro cloud so that the resource demand of the vehicular micro cloud is met.

20 Claims, 10 Drawing Sheets

REORGANIZING AUTONOMOUS ENTITIES FOR IMPROVED VEHICULAR MICRO CLOUD OPERATION

BACKGROUND

The specification relates to reorganizing one or more autonomous entities for improved vehicular micro cloud operation. Specifically, this specification relates to reorganizing autonomous entities to meet a resource demand of a vehicular micro cloud.

Distributed data storage by a cluster of connected vehicles (herein "vehicle" if singular or "vehicles" if plural) is a promising solution to cope with increasing network traffic generated for and by the connected vehicles. Such a cluster is referred to herein as a "vehicular micro cloud." In the vehicular micro cloud, the vehicles may collaboratively perform computation, data storage, sensing, communication tasks and any combination thereof among one another over vehicle-to-vehicle (V2V) networks. However, a shortage of computing resources may occur in the vehicular micro cloud if, for example, an amount of computing resources requested by the vehicles of the vehicular micro cloud exceeds a total amount of computing resources that are available in the vehicular micro cloud.

SUMMARY

One general aspect of embodiments described herein includes a computer program product including a non-transitory memory of an onboard vehicle computer system of a connected vehicle storing computer-executable code that, when executed by a processor, causes the processor to: modify an operation of a communication unit of the connected vehicle to transmit, via a Vehicle-to-Everything (V2X) network, a request message that includes a resource demand of a vehicular micro cloud; modify the operation of the communication unit to receive, via the V2X network, a reorganization message that includes a reorganization instruction to fulfill the resource demand of the vehicular micro cloud; and execute the reorganization instruction to incorporate an autonomous entity as a new member of the vehicular micro cloud so that one or more resources of the autonomous entity become available in the vehicular micro cloud to meet the resource demand of the vehicular micro cloud while a travel requirement of the autonomous entity is also satisfied. Other embodiments of this aspect include corresponding computer systems, apparatus, and computer programs recorded on one or more computer storage devices, each configured to perform the actions of the methods.

Implementations may include one or more of the following features. The computer program product where the autonomous entity is re-routed to be physically present within a communication range of one or more other members of the vehicular micro cloud so that the one or more resources of the autonomous entity are accessible by the one or more other members. The computer program product where the autonomous entity includes an autonomous platoon that is reorganized to meet the resource demand of the vehicular micro cloud. Implementations of the described techniques may include hardware, a method or process, or computer software on a computer-accessible medium.

One general aspect includes a method for a connected vehicle that is a member of a vehicular micro cloud, including: modifying an operation of a communication unit of the connected vehicle to receive, via a V2X network, a reorganization message that includes a reorganization instruction to fulfill a resource demand of the vehicular micro cloud; and executing the reorganization instruction to incorporate one or more resources of an autonomous entity into a resource pool of the vehicular micro cloud so that the resource demand of the vehicular micro cloud is met. Other embodiments of this aspect include corresponding computer systems, apparatus, and computer programs recorded on one or more computer storage devices, each configured to perform the actions of the methods.

Implementations may include one or more of the following features. The method where executing the reorganization instruction to incorporate the one or more resources of the autonomous entity into the resource pool of the vehicular micro cloud includes: incorporating the autonomous entity to be a new member of the vehicular micro cloud so that the one or more resources become available to one or more other members of the vehicular micro cloud while a travel requirement of the autonomous entity is also satisfied. The method where the autonomous entity is re-routed to be physically present within a communication range of the one or more other members of the vehicular micro cloud to provide the one or more resources to the one or more other members. The method where the autonomous entity is selected to join the vehicular micro cloud based on one or more selection factors that include one or more of the following: the resource demand of the vehicular micro cloud; a period of time that the autonomous entity is expected to remain in the vehicular micro cloud; a location coverage of the vehicular micro cloud; and the travel requirement of the autonomous entity. The method where the autonomous entity includes an autonomous platoon that is reorganized to meet the resource demand of the vehicular micro cloud. The method where a travel path of the autonomous entity is dynamically adjusted to provide the one or more resources to the vehicular micro cloud based on one or more of the resource demand of the vehicular micro cloud and a travel requirement of the autonomous entity. The method where a speed of the autonomous entity is adjusted to maximize a capability of the autonomous entity to provide the one or more resources to the vehicular micro cloud. The method where executing the reorganization instruction further includes modifying an operation of a vehicle control system of the connected vehicle to re-route the connected vehicle based on a route provided by the reorganization instruction so that a resource requirement of the connected vehicle is satisfied. The method where prior to receiving the reorganization message, the method further includes: determining vehicular cloud information that describes the vehicular micro cloud; determining the resource demand of the vehicular micro cloud; and modifying the operation of the communication unit to transmit, via the V2X network, a request message that includes the vehicular cloud information and the resource demand of the vehicular micro cloud. Implementations of the described techniques may include hardware, a method or process, or computer software on a computer-accessible medium.

One general aspect includes a system of a connected vehicle that is a member of a vehicular micro cloud, including a processor and a non-transitory memory storing computer code which, when executed by the processor, causes the processor to: modify an operation of a communication unit of the connected vehicle to receive, via a V2X network, a reorganization message that includes a reorganization instruction to fulfill a resource demand of the vehicular micro cloud; and execute the reorganization instruction to incorporate one or more resources of an autonomous entity into a resource pool of the vehicular micro cloud so that the resource demand of the vehicular micro cloud is met. Other embodiments of this aspect include corresponding computer systems, apparatus, and computer programs recorded on one or more computer storage devices, each configured to perform the actions of the methods.

Implementations may include one or more of the following features. The system where the computer code, when executed by the processor, causes the processor to execute the reorganization instruction to incorporate the one or more resources of the autonomous entity into the resource pool of the vehicular micro cloud at least by: incorporating the autonomous entity to be a new member of the vehicular micro cloud so that the one or more resources become available to one or more other members of the vehicular micro cloud while a travel requirement of the autonomous entity is also satisfied. The system where the autonomous entity is re-routed to be physically present within a communication range of the one or more other members of the vehicular micro cloud to provide the one or more resources to the one or more other members. The system where the autonomous entity is selected to join the vehicular micro cloud based on one or more selection factors that include one or more of the following: the resource demand of the vehicular micro cloud; a period of time that the autonomous entity is expected to remain in the vehicular micro cloud; a location coverage of the vehicular micro cloud; and the travel requirement of the autonomous entity. The system where the autonomous entity includes an autonomous platoon that is reorganized to meet the resource demand of the vehicular micro cloud. The system where a travel path of the autonomous entity is dynamically adjusted to provide the one or more resources to the vehicular micro cloud based on one or more of the resource demand of the vehicular micro cloud and a travel requirement of the autonomous entity. The system where a speed of the autonomous entity is adjusted to maximize a capability of the autonomous entity to provide the one or more resources to the vehicular micro cloud. The system where prior to receiving the reorganization message, the computer code, when executed by the processor, causes the processor to: determine vehicular cloud information that describes the vehicular micro cloud; determine the resource demand of the vehicular micro cloud; and modify the operation of the communication unit to transmit, via the V2X network, a request message that includes the vehicular cloud information and the resource demand of the vehicular micro cloud. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
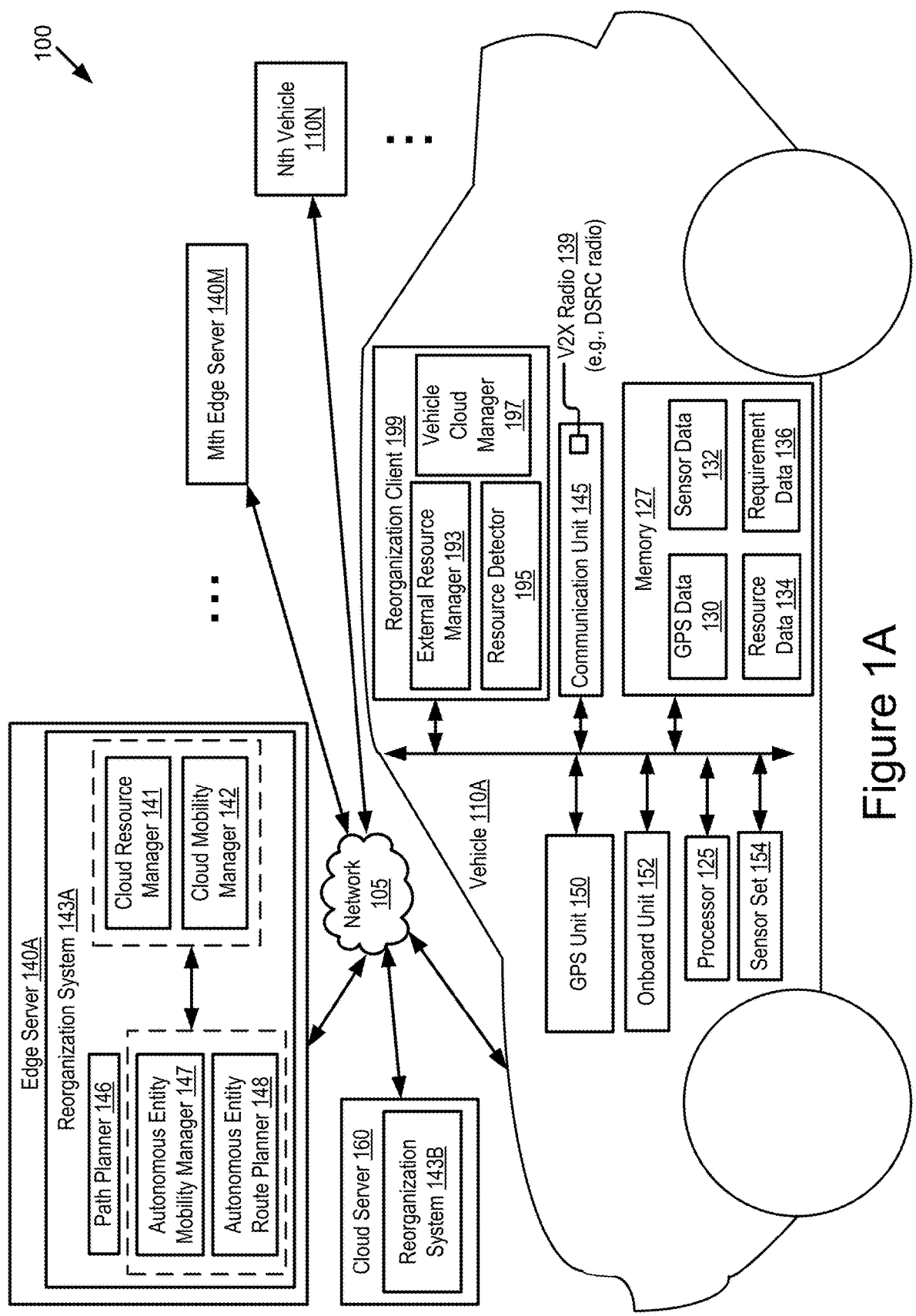
FIG. 1A is a block diagram illustrating an operating environment for a reorganization system and a reorganization client according to some embodiments.

A vehicular micro cloud may also be referred to as a micro-vehicular cloud. Vehicular micro clouds and other types of cooperative computing for vehicles are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; U.S. patent application Ser. No. 15/799,963 filed on Oct. 31, 2017 and entitled "Identifying a Geographic Location for a Stationary Micro-Vehicular Cloud;" and U.S. patent application Ser. No. 16/297,251 filed on Mar. 8, 2019 and entitled "Resource Assurance for Vehicle Cloudification."

Vehicles that are close by one another can form a vehicular micro cloud. Vehicles that join a vehicular micro cloud are referred to as "members of the vehicular micro cloud" herein. A member of a vehicular micro cloud is a vehicle that shares a V2X connection with one or more of the other members of the vehicular micro cloud, makes its unused computing resources available to the other members of the vehicular micro cloud via the V2X connection, and has unused computing resources of the other members of the vehicular micro cloud made available to it via the V2X connection.

In some scenarios, a vehicular micro cloud can be used to provide services to connected vehicles that are members of the vehicular micro cloud. These services are referred to herein as "cloudification services." These cloudification services include, for example, one or more of the following: dynamic map generation, cooperative path planning, and distributed data storage. In some embodiments, the members of the vehicular micro cloud can also offer services to members of other vehicular micro or macro clouds.

However, each vehicle that is a member of a vehicular micro cloud has a limited amount of resources that can be used by other members of the vehicular micro cloud. For example, each vehicle has limited amounts of the following onboard resources: central processing unit (CPU) power; memory; data storage; communication bandwidth; communication throughput; onboard sensors; and sensor data. Other members of the vehicular micro cloud may request cloudification services from members of the vehicular micro cloud that are referred to as "host vehicles." A host vehicle is a member of the vehicular micro cloud that fulfills a cloudification service request.

A problem with vehicular micro clouds is now described. In some scenarios, some members of the vehicular micro cloud may demand a large amount of computing resources from the vehicular micro cloud. However, the computing resources available from the vehicular micro cloud are dependent on a quantity of vehicles that are in the vehicular micro cloud and physically present within a communication range of the vehicular micro cloud. If a request for a cloudification service from a member of the vehicular micro cloud requires too much computing resources, the request may be rejected or new computing resources may need to be provided to the vehicular micro cloud. For example, responsive to a resource deficiency in the vehicular micro cloud, external computing resources can be provided to and incorporated into a resource pool of the vehicular micro cloud so that the external computing resources can be used by members of the vehicular micro cloud.

The embodiments described herein solve the problem described in the preceding paragraph. Specifically, described herein are embodiments of a reorganization system and a reorganization client that can cooperate with one another to manage external resources and incorporate the external resources into a resource pool of the vehicular micro cloud so that the external resources are accessible by members of the vehicular micro cloud. For example, the reorganization system and the reorganization client cooperate with one another to reorganize autonomous entities to provide external resources to the vehicular micro cloud so that a resource demand of the vehicular micro cloud is met.

In some embodiments, the reorganization system and the reorganization client described herein cooperate with one another to: (1) determine a resource demand of a vehicular micro cloud (e.g., based on resource requirements of vehicles that are members of the vehicular micro cloud); and (2) reorganize one or more autonomous entities to become members of the vehicular micro cloud and to be physically present within a wireless communication range of other members of the vehicular micro cloud. In this way, the one or more autonomous entities can make their resources available to the other members of the vehicular micro cloud. Example resources provided by the one or more autonomous entities to the vehicular micro cloud include, but are not limited to, the following: computation power (e.g., CPU processing time); memory; data storage; communication bandwidth; and sensor-data sharing, etc. Other example resources are also possible.

Specifically, the reorganization system and the reorganization client cooperate with one another to incorporate resources of the one or more autonomous entities as part of resources of the vehicular micro cloud through (1) a re-routing of the one or more autonomous entities, (2) reorganized configurations of the one or more autonomous entities or (3) a combination thereof.

The re-routing of the one or more autonomous entities includes dynamically adjusting travel paths of the one or more autonomous entities to offer extra resources to the vehicular micro cloud whose resources are (expected to be) insufficient to sustain cloudification services. Meanwhile, travel requirements of the one or more autonomous entities are also satisfied (e.g., destinations and travel time constraints of the autonomous entities are satisfied). This re-routing can be determined based on one or more of (1) the resource demand of the vehicular micro cloud and (2) the travel requirements of the one or more autonomous entities.

In some embodiments, travel speeds of the one or more autonomous entities can also be adjusted so that they can stay in the vehicular micro cloud as long as possible while their travel requirements are also satisfied.

In some embodiments, the one or more autonomous entities may include at least an autonomous platoon. The reorganized configurations of the one or more autonomous entities may include dynamically reorganizing a structure of the autonomous platoon to meet the resource demand of the vehicular micro cloud. For example, the autonomous platoon may be split into multiple autonomous platoons or merged with another autonomous platoon to offer an appropriate amount of resources to the vehicular micro cloud. In another example, one or more new autonomous vehicles may join the autonomous platoon based on one or more predefined policies so that more resources can be offered by the autonomous platoon.

At least an example benefit of the reorganization system and the reorganization client described herein includes introducing a mechanism that is capable of handling mobility of autonomous entities and mobility of a vehicular micro cloud. This mechanism is capable of satisfying a resource demand present within the vehicular micro cloud or expected to be within the vehicular micro cloud in a near term by reorganizing the autonomous entities. For example, the autonomous entities can be reorganized (e.g., re-routed or reorganized with new configurations) to provide additional resources to the vehicular micro cloud so that the resource demand of the vehicular micro cloud can be satisfied. Meanwhile, this mechanism also ensures that travel requirements of the autonomous entities are also satisfied (e.g., a satisfaction of a pre-determined destination and a travel time constraint for each reorganized autonomous entity).

As used herein, an autonomous entity can include a single machine or a group of machines. The autonomous entity is capable of being driven autonomously through communications. Examples of the autonomous entity include, but are not limited to, the following: an autonomous vehicle; an autonomous motorcycle; and an autonomous platoon, etc. The autonomous entity may have a predefined destination with a dynamically-updated route, a dynamically-updated configuration or a combination thereof based on traffic conditions, a time constraint to arrive at the destination, a coverage of roadside units or a combination thereof, etc. The autonomous entity can be driven on highways and urban areas in smart cities with multi-lane configuration roads with or without manually driven vehicles. The autonomous entity is capable of following a certain vehicle, pre-determined roads or a combination thereof.

As used herein, an autonomous platoon may include a set of autonomous machines that coordinate with one another through wireless communications to move together in a group. For example, au autonomous platoon may include a group of autonomous vehicles or autonomous motorcycles that coordinate with one another via V2V networks. This coordination within the autonomous platoon can be implemented in a centralized manner or a distributed manner. For example, one autonomous machine in the group (typically the first machine in the platoon) becomes a leader, while other autonomous machines in the group follow the leader to adjust their speeds and distances via the leader's message that is transmitted periodically.

A configuration of the autonomous platoon can be controlled via one or more platoon management protocols. Reorganization of the autonomous platoon may include one or more of the following: (1) a new autonomous machine may enter the autonomous platoon (e.g., the autonomous machine may join the platoon); (2) an autonomous machine may leave the autonomous platoon (e.g., the autonomous machine may exit from the platoon); (3) the autonomous platoon is merged with another autonomous platoon (e.g., two autonomous platoons that are traveling in a same lane can be combined into a single platoon); and (4) the autonomous platoon may be split into two platoons with smaller sizes.

The autonomous platoon can be redefined as moving resources: (1) that have a pre-defined destination with a travel requirement (e.g., travel time constraints); (2) that follow a leader of the autonomous platoon, pre-determined roads or a combination thereof; and (3) that obey instructions from other autonomous machines (e.g., the leader), management protocols or a combination thereof. Application of the autonomous platoon can be beneficial so that a traffic throughput is increased. Traffic flow can also be improved and fuel consumption and emission can be reduced. Other example benefits are also possible.

As used herein, depending on mobility of a vehicular micro cloud, the vehicular micro cloud can be categorized as a stationary vehicular micro cloud or a mobile vehicular micro cloud. A stationary vehicular micro cloud can be tied to a certain geographical region (e.g., an intersection). A vehicle joins a stationary vehicular micro cloud when entering a pre-defined geographical region of the stationary vehicular micro cloud and leaves the stationary vehicular micro cloud when exiting from the pre-defined geographical region. In some embodiments, parked vehicles can also be members of the stationary vehicular micro cloud.

In a mobile vehicular micro cloud, a cloud leader (e.g., a vehicle which acts as a leader in the vehicular micro cloud) can invite its neighboring vehicles to join the mobile vehicular micro cloud. Unlike the stationary vehicular micro cloud, the mobile vehicular micro cloud moves as the cloud leader moves. The cloud leader recruits other cloud members into the mobile vehicular micro cloud and distributes sub-tasks to the other cloud members for collaborative task execution.

As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mm-Wave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X message) described herein include, but are not limited to, the following messages: a DSRC message; a BSM Message; a LTE message; a LTE-V2X message (e.g., a LTE-V2V message, a LTE-V2I message, an LTE-V2N message, etc.); a 5G-V2X message; and a millimeter wave message, etc.

As used herein, the words "geographic location," "location," "geographic position" and "position" refer to a latitude and longitude of an object (or, a latitude, longitude, and elevation of an object) such as a vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Example Overview

Referring to FIG. 1A, depicted is an example operating environment 100 for a reorganization client 199 and a reorganization system 143. For example, the operating environment 100 includes one or more vehicles 110, one or more edge servers 140 and a cloud server 160. These elements of the operating environment 100 may be communicatively coupled to a network 105.

The one or more vehicles 110 include a first vehicle 110A, . . . , and an Nth vehicle 110N, which may provide similar functionality and are referred to herein as "vehicle 110" individually or collectively. Here, N is a positive integer greater than or equal to one. Each of the "N" number of vehicles may have the reorganization client 199. However, it is not required that all of the "N" number of vehicles include a reorganization client.

The one or more edge servers 140 includes a first edge server 140A, . . . , and an Mth edge server 140M, which may provide similar functionality and are referred to herein as "edge server 140" individually or collectively. Here, M is a positive integer greater than or equal to one.

Although two vehicles 110, two edge servers 140, one cloud server 160 and one network 105 are depicted in FIG. 1A, in practice the operating environment 100 may include any number of vehicles 110, edge servers 140, cloud servers 160 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 includes a V2X network (e.g., a V2X wireless network). The V2X network is a communication network that enables entities such as elements of the operating environment 100 to wirelessly communicate with one another via a form of V2X communications.

The vehicle 110 may be any type of vehicle. The vehicle 110 may be one of the following types of vehicles: a car; a truck; a sports utility vehicle; a bus; a semi-truck; a drone or any other roadway-based conveyance. In some embodiments, the vehicle 110 includes a communication unit such that the vehicle is a "connected vehicle," where the communication unit includes any hardware and software that is needed to enable the vehicle 110 to communicate with other entities via the network 105.

In some embodiments, the vehicle 110 may be an autonomous vehicle or a semi-autonomous vehicle. For example, the vehicle 110 may include one or more Advanced Driver-Assistance Systems (ADAS systems) or an autonomous driving system. The one or more ADAS systems or the autonomous driving system may provide some or all of the autonomous functionality.

In some embodiments, the vehicle 110 includes the reorganization client 199, a communication unit 145, a processor 125, a memory 127, a GPS unit 150, an onboard unit 152 and a sensor set 154.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 110 may include one or more processors 125. Other processors, operating systems, sensors, displays, and physical configurations may be possible.

For example, the processor 125 can be an element of the onboard unit 152 or an electronic control unit of the vehicle 110.

The memory 127 stores instructions or data that may be executed by the processor 125 of the vehicle 110. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The vehicle 110 may include one or more memories 127.

In some embodiments, the memory 127 stores one or more of the following elements: GPS data 130; sensor data 132; resource data 134; and requirement data 136.

The GPS data 130 may include digital data describing a geographic location of the vehicle 110. For example, the GPS data 130 includes digital data describing a latitude and longitude of the vehicle 110 (or, a latitude, a longitude, and an elevation of the vehicle 110).

The sensor data 132 includes digital data that describes sensor measurements of the sensor set 154. For example, the sensor data 132 may include digital data describing one or more of a speed, a heading, a route destination and an expected arrival time at the route destination, etc.

The resource data 134 may include digital data describing one or more resources available on the vehicle 110.

The requirement data 136 may include digital data describing a resource requirement of the vehicle 110. For example, the requirement data 136 describes one or more of an amount of CPU processing power, an amount of memory, an amount of storage and an amount of communication bandwidth needed by the vehicle 110.

The communication unit 145 transmits and receives data to and from the network 105 or to another communication channel. In some embodiments, the communication unit 145 may include a DSRC transceiver, a DSRC receiver and other hardware or software necessary to make the vehicle 110 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 139 used for conducting V2X communications. For example, the V2X radio 139 includes a DSRC radio. In another example, the V2X radio 139 includes hardware, software, or a combination thereof for performing mmWave communications. Other examples of the V2X radio 139 are possible. It should be noted that DSRC is not a requirement here. Embodiments described herein can be implemented with any form of V2X communications.

In some embodiments, the GPS unit 150 is a conventional GPS unit of the vehicle 110. For example, the GPS unit 150 may include hardware that wirelessly communicates with a GPS satellite to retrieve data that describes a geographic location of the vehicle 110. For example, the GPS unit 150 retrieves GPS data describing the geographic location of the vehicle 110 from one or more GPS satellites.

In some embodiments, the GPS unit 150 is a DSRC-compliant GPS unit of the vehicle 110 that is operable to provide GPS data describing the geographic location of the vehicle 110 with lane-level accuracy. In this case, the vehicle 110 can be a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters (±1.5 m) is sufficient to identify which lane a vehicle is traveling in on a roadway.

The onboard unit 152 can include one or more processors and one or more memories. For example, the onboard unit 152 includes an electronic control unit (ECU). In some embodiments, the reorganization client 199 is installed in the onboard unit 152.

The sensor set 154 includes one or more sensors that are operable to measure a roadway environment outside of the vehicle 110. For example, the sensor set 154 may include one or more sensors that record one or more physical characteristics of the road environment that is proximate to the vehicle 110. The memory 127 may store sensor data that describes the one or more physical characteristics recorded by the sensor set 154. The roadway environment outside of the vehicle 110 may include other vehicles (as well as other objects or people) in the operating environment 100, and so, one or more sensors of the sensor set 154 may record sensor data that describes information about the other vehicles (as well as other objects or people) in the operating environment 100.

In some embodiments, the sensor set 154 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

Figure 1B:
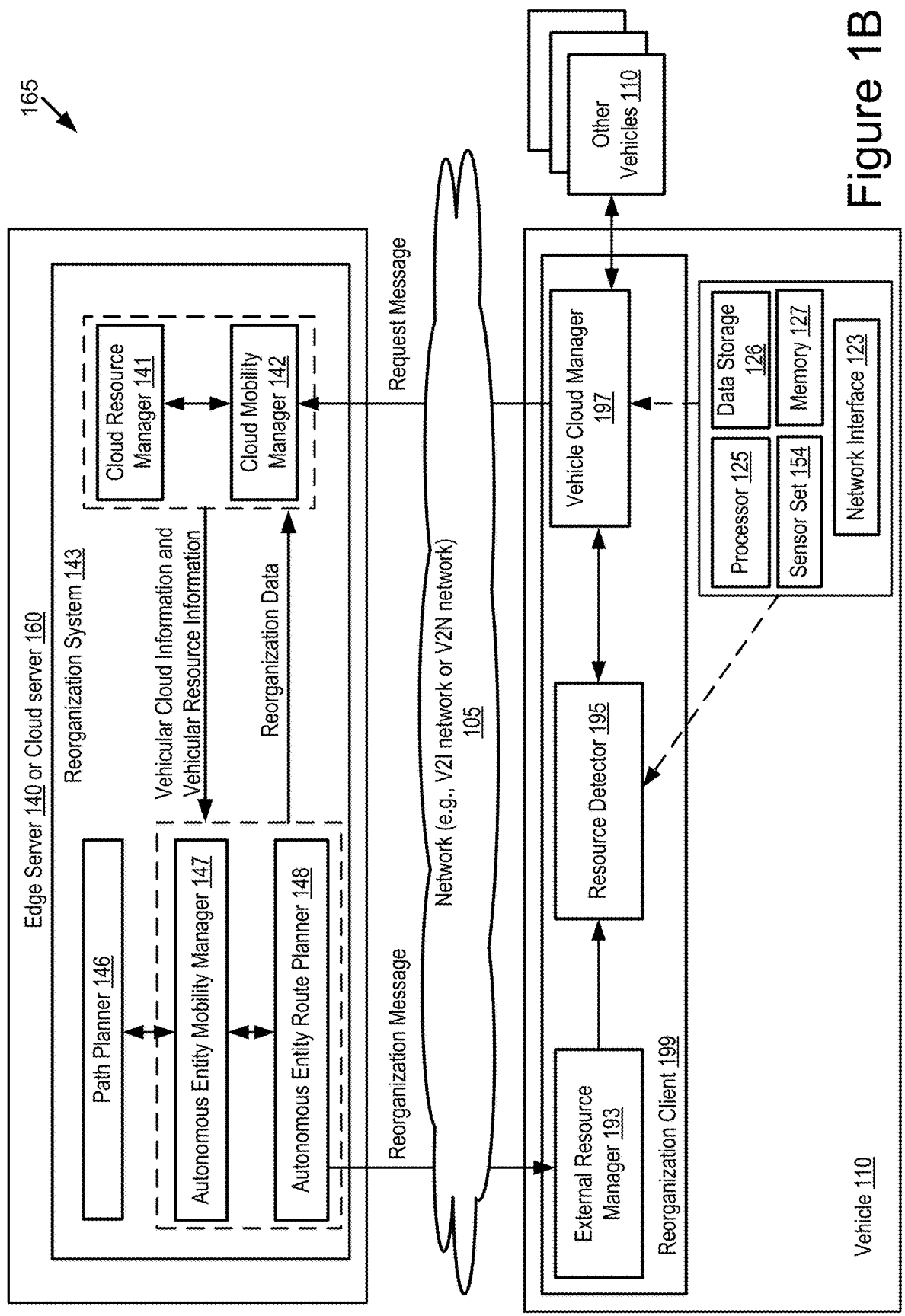
FIG. 1B is a block diagram illustrating a system architecture for the reorganization system and the reorganization client according to some embodiments.
Figure 1C:
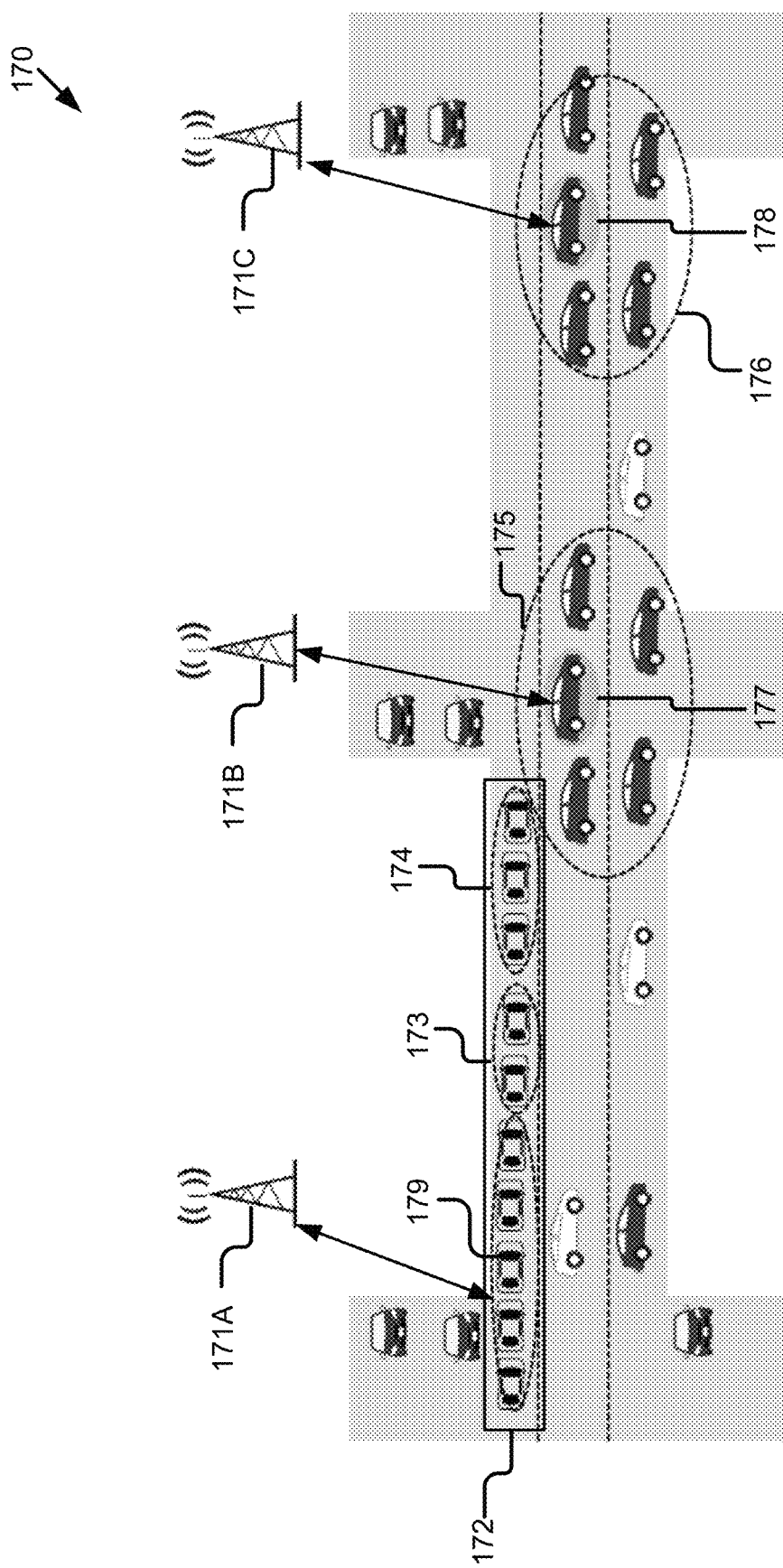
FIGS. 1C-1D are graphical representations illustrating an example use case of reorganizing autonomous entities to meet resource demands of vehicular micro clouds according to some embodiments.
Figure 1D:
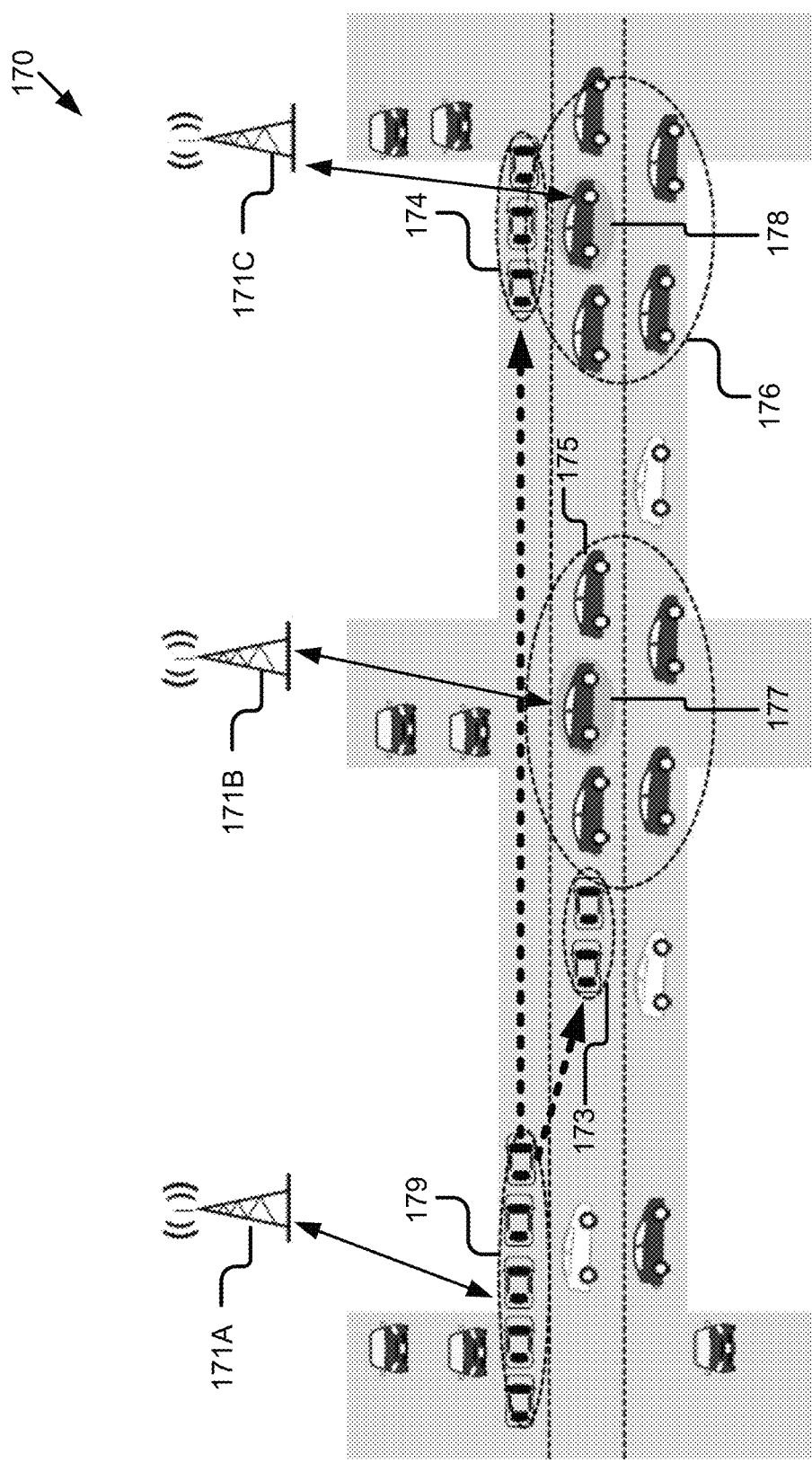
Figure 3:
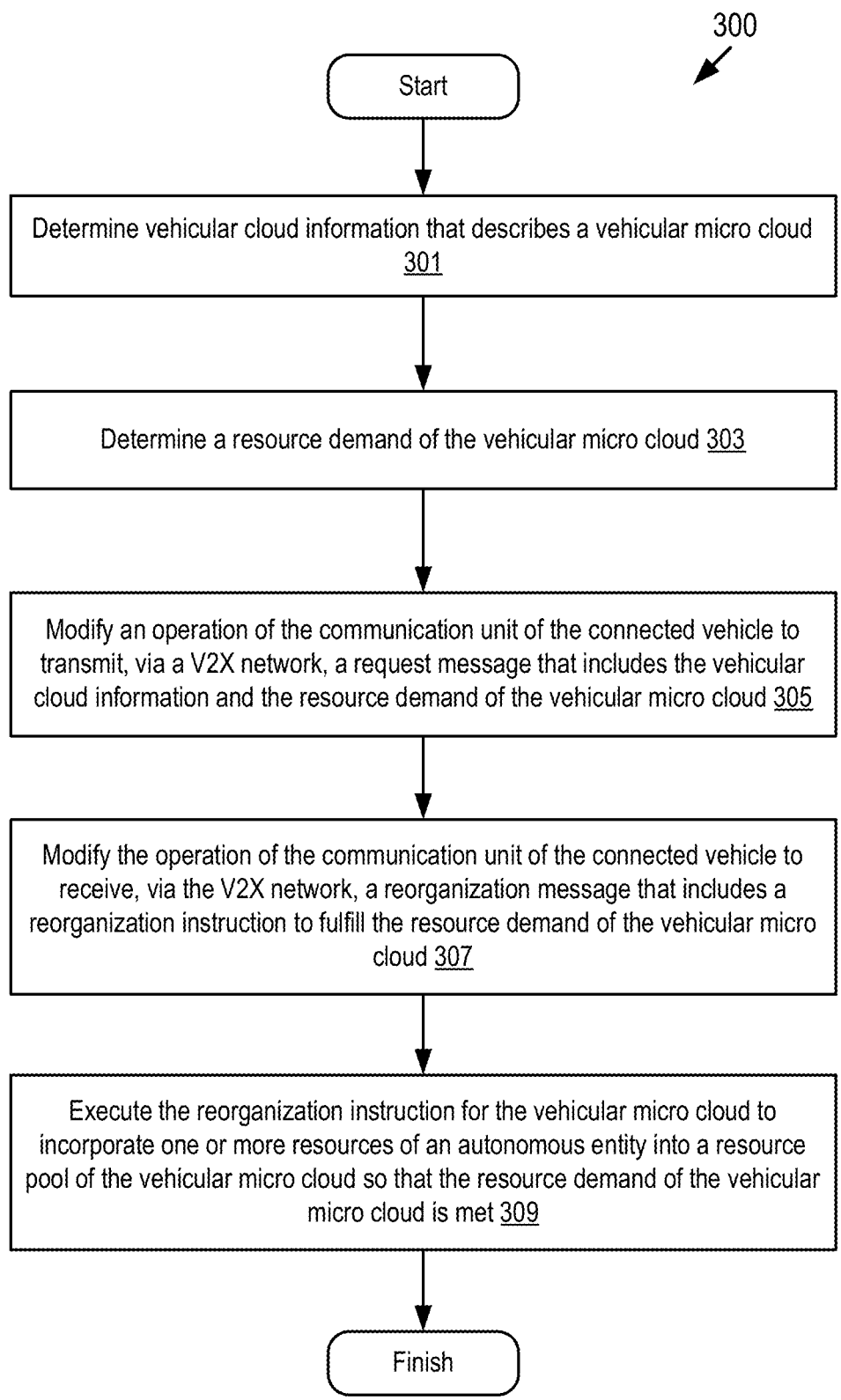
FIG. 3 depicts a method for managing a resource demand of a vehicular micro cloud on a connected vehicle according to some embodiments.
Figure 5:
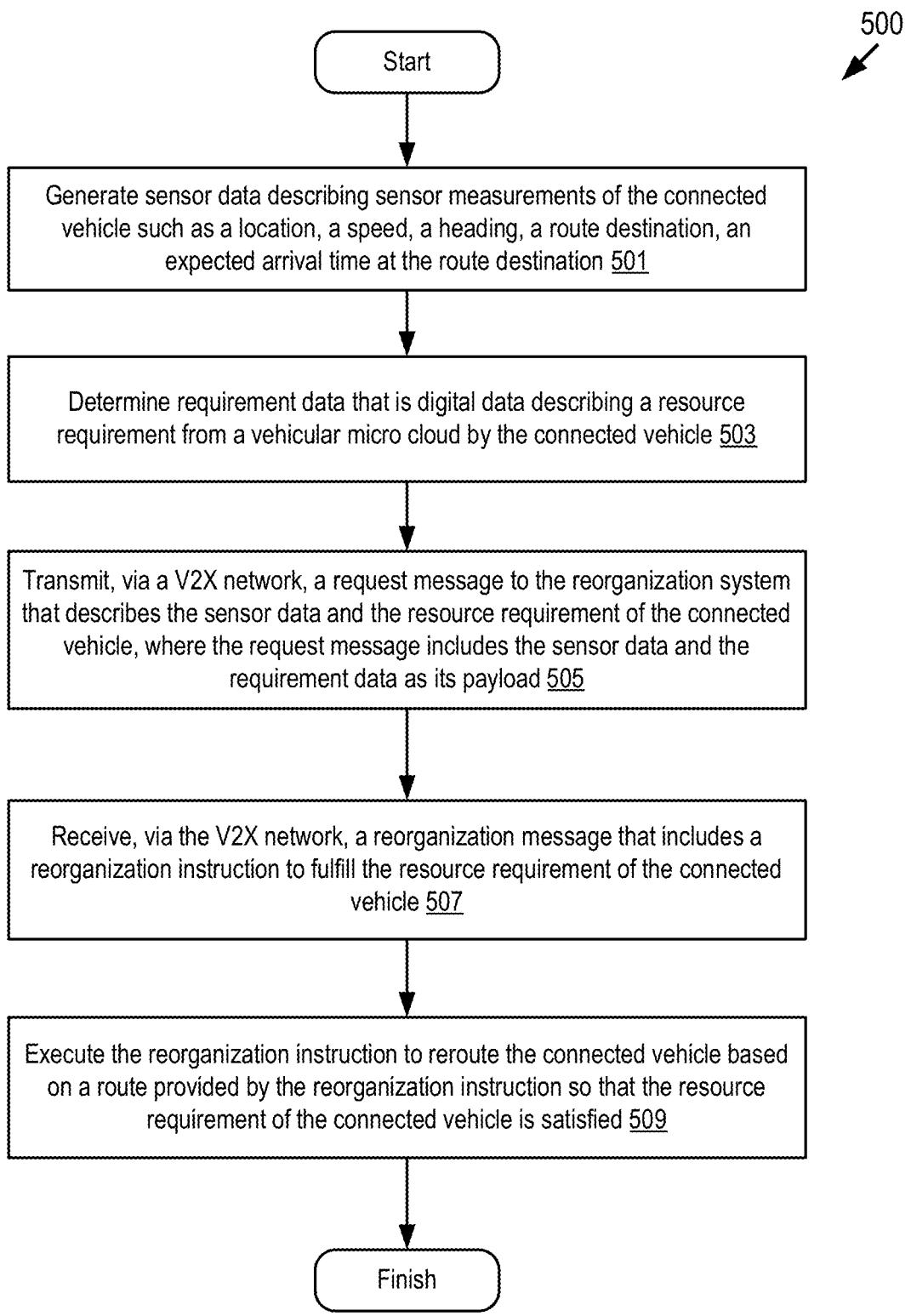
FIG. 5 depicts a method for managing a resource requirement of a connected vehicle according to some embodiments.

In some embodiments, the reorganization client 199 includes software that is operable, when executed by the processor 125 of the vehicle 110, to cause the processor 125 to execute one or more operations performed in FIGS. 1B-1D or one or more steps of methods 300 and 500 with reference to FIGS. 3 and 5.

In some embodiments, the reorganization client 199 may be implemented using hardware including a field-programmable gate array ("FPGA") or an application-specific integrated circuit ("ASIC"). In some other embodiments, the reorganization client 199 may be implemented using a combination of hardware and software. The reorganization client 199 may be stored in a combination of the devices (e.g., vehicles or other devices), or in one of the devices.

In some embodiments, the reorganization client 199 is installed in the onboard unit 152 of the vehicle 110 (e.g., an electronic control unit or some other onboard vehicle computer). The reorganization client 199 includes one or more of the following elements: an external resource manager 193; a resource detector 195; and a vehicle cloud manager 197.

The reorganization client 199, as well as the external resource manager 193, the resource detector 195 and the vehicle cloud manager 197, is further described below with reference to FIGS. 1B-3 and 5.

The edge server 140 includes a processor-based computing device which is installed in a roadside unit ("RSU") or some other processor-based infrastructure component of a roadway. In the operating environment 100 illustrated in FIG. 1A, the edge server 140A includes a reorganization system 143A and a communication unit (not depicted in FIG. 1A). The edge server 140M may have a structure similar to that of the edge server 140A, and so, similar description will not be repeated here.

In some embodiments, edge servers 140 are not available. For example, roadside units may not be available in rural environments to serve as edge servers. Accordingly, the cloud server 160 can host an instance of the reorganization system (e.g., a reorganization system 143B) so that this cloud-based reorganization system can serve rural vehicles. Accordingly, embodiments described herein can be applied in urban environments as well as rural environments.

The reorganization systems 143A and 143B may have similar structure and provide similar functionality. Thus, the reorganization systems 143A and 143B can be referred to as "reorganization system 143" individually or collectively.

The reorganization system 143 includes software installed on one or more of endpoints of the network 105 depicted in FIG. 1A. As depicted, the reorganization system 143 is installed in the edge server 140 or the cloud server 160. The reorganization system 143 includes code and routines that are operable, when executed by a processor of the edge server 140 or the cloud server 160, to cause the processor to execute one or more operations performed in FIGS. 1B-1D or one or more steps of methods 400 and 600 with reference to FIGS. 4A-4B and 6.

In some embodiments, the reorganization system 143 may be implemented using hardware including an FPGA or an ASIC. In some other embodiments, the reorganization system 143 may be implemented using a combination of hardware and software. The reorganization system 143 may be stored in a combination of the devices (e.g., the edge server 140, the cloud server 160, the vehicle 110 or other devices), or in one of the devices. For example, any combination of cloud servers 160, edge servers 140 and vehicles 110 may include instances of the reorganization system 143 so that the functionality of the reorganization system 143 is implemented in a distributed fashion among two or more endpoints connected to the network 105.

In some embodiments, the reorganization system 143 includes one or more of the following elements: a cloud resource manager 141; a cloud mobility manager 142; a path planner 146; an autonomous entity mobility manager 147; and an autonomous entity route planner 148. The reorganization system 143 and its elements are described below in more detail with reference to FIGS. 1B-1D, 4A-4B and 6.

Referring to FIG. 1B, depicted is a system architecture 165 for the reorganization system 143 and the reorganization client 199 according to some embodiments. An onboard unit of the vehicle 110 (e.g., the onboard unit 152) includes, for example, the processor 125, a data storage 126 for storing data, the sensor set 154, the memory 127, a network interface 123 and the reorganization client 199.

Turning to the reorganization client 199 at first, the resource detector 195 is operable to monitor measurements from onboard sensors of the sensor set 154 and to receive first sensor data from the onboard sensors (illustrated using a dashed arrow line in FIG. 1B). The resource detector 195 determines first resources available on the vehicle 110 based at least on the first sensor data. The resource detector 195 sends digital data describing the first resources available on the vehicle 110 to the vehicle cloud manager 197. The vehicle 110 may be a member of a vehicular micro cloud, and the first resources available on the vehicle 110 may include onboard resources of the vehicle 110 that are available for use by other members of the vehicular micro cloud. The first resources may become part of a resource pool maintained by the vehicular micro cloud, where the resource pool includes resources that are accessible by members of the vehicular micro cloud.

In some embodiments, the vehicle cloud manager 197 performs coordination with other vehicles 110 to form the vehicular micro cloud so that the other vehicles 110 become members of the vehicular micro cloud. The vehicle cloud manager 197 performs maintenance of intra-micro-cloud wireless links among members of the vehicular micro cloud. The vehicle cloud manager 197 controls resource utilization in the resource pool and collaborative task execution in the vehicular micro cloud. The vehicle cloud manager 197 may also conduct clustering or platooning in vehicular ad-hoc networks. The vehicle cloud manager 197 may also provide other functionality, which is not limited here.

In some embodiments, the vehicle cloud manager 197 may communicate with the resource detector 195 to determine a resource requirement of the vehicle 110 and the first resources available on the vehicle 110. The vehicle cloud manager 197 may receive the first sensor data associated with the vehicle 110 from the sensor set 154. The vehicle cloud manager 197 may also communicate with the other vehicles 110 to determine resource requirements of the other vehicles 110 and second resources available on the other vehicles 110. The vehicle cloud manager 197 may receive second sensor data associated with the other vehicles 110 from sensor sets of the other vehicles 110.

The vehicle cloud manager 197 may determine a total amount of resources currently available in the vehicular micro cloud as a sum of the first resources available on the vehicle 110 and the second resources available on the other vehicles 110. The vehicle cloud manager 197 determines a total resource requirement of the vehicular micro cloud as a sum of the resource requirement of the vehicle 110 and the resource requirements of the other vehicles 110.

The vehicle cloud manager 197 determines a resource demand of the vehicular micro cloud as a difference between the total resource requirement and the total amount of resources currently available in the vehicular micro cloud (e.g., the resource demand=the total resource requirement—the total amount of resources currently available in the vehicular micro cloud). The resource demand of the vehicular micro cloud may represent, for example, an amount of resources that are deficient in the vehicular micro cloud.

The vehicle cloud manager 197 may determine vehicular cloud information that describes the vehicular micro cloud based on the first sensor data of the vehicle 110 and the second sensor data of the other vehicles 110. For example, the vehicular cloud information may include one or more of: locations of members of the vehicular micro cloud; destinations of the members; routes of the members; and headings of the members, etc. In some embodiments, the vehicular cloud information may include geo-location information of the vehicular micro cloud. The geo-location of the vehicular micro cloud may include: (1) a coordinate of the vehicular micro cloud if the vehicular micro cloud is a stationary vehicular micro cloud (e.g., a coordinate of an intersection if the vehicular micro cloud is formed around the intersection); or (2) a relative position of a cloud leader in the vehicular micro cloud if the vehicular micro cloud is a mobile vehicular micro cloud.

The vehicle cloud manager 197 may modify an operation of the communication unit 145 of the vehicle 110 to transmit, via a V2X network, a request message to the reorganization system 143. The request message includes one or more of the vehicular cloud information and the resource demand of the vehicular micro cloud.

In some embodiments, the vehicle cloud manager 197 may share the vehicular cloud information (e.g., geo-location information) of the vehicular micro cloud with the cloud mobility manager 142. The vehicle cloud manager 197 may share vehicular resource information of the vehicular micro cloud (e.g., the resource demand, resources requested by the vehicular micro cloud, resources allocated to the vehicular micro cloud, etc.) with the cloud resource manager 141.

Now turning to the reorganization system 143, the cloud mobility manager 142 receives the vehicular cloud information (e.g., geo-location information of the vehicular micro cloud) from the vehicle cloud manager 197. The cloud mobility manager 142 forwards the vehicular cloud information to the autonomous entity mobility manager 147 and the autonomous entity route planner 148.

In some embodiments, the cloud resource manager 141 receives the vehicular resource information of the vehicular micro cloud from the vehicle cloud manager 197. The cloud resource manager 141 forwards the vehicular resource information to the autonomous entity mobility manager 147 and the autonomous entity route planner 148.

The path planner 146 is operable to determine travel information of each autonomous entity that is within a service area of the edge server 140 (or the cloud server 160). The travel information includes one or more of a destination, a route, a travel time and an expected arrival time of the autonomous entity. The path planner 146 sends travel information of each autonomous entity to the autonomous entity mobility manager 147.

The autonomous entity mobility manager 147 is operable to continuously monitor the travel information of each autonomous entity and sends the travel information to the autonomous entity route planner 148. In some embodiments, the autonomous entity mobility manager 147 receives the vehicular cloud information and the vehicular resource information of the vehicular micro cloud from the cloud mobility manager 142 and the cloud resource manager 141 respectively. The autonomous entity mobility manager 147 forwards the vehicular cloud information and the vehicular resource information to the autonomous entity route planner 148. The autonomous entity mobility manager 147 also forwards the travel requirement of each autonomous entity to the autonomous entity route planner 148. The travel requirement may include one or more of a destination, an expected arrival time at the destination and any other requirement of the autonomous entity.

The autonomous entity route planner 148 is operable to reorganize one or more autonomous entities based on one or more of: (1) the vehicular cloud information (e.g., geo-location information) of the vehicular micro cloud; (2) the vehicular resource information (e.g., a resource demand) of the vehicular micro cloud; and (3) the travel requirement of each autonomous entity. In this way, the one or more autonomous entities can provide their resources to the vehicular micro cloud to meet the resource demand of the vehicular micro cloud, while one or more travel requirements of the one or more autonomous entities are also satisfied (e.g., no violation of a destination and a travel requirement such as a travel time constraint determined by the path planner 146 for each of the one or more autonomous entities).

Specifically, the autonomous entity route planner 148 may determine one or more autonomous entities based on travel information of the one or more autonomous entities and the vehicular cloud information. For example, the autonomous entity route planner 148 may determine one or more autonomous entities that have one or more destinations close to a destination of a cloud leader of the vehicular micro cloud. In another example, the autonomous entity route planner 148 may determine one or more autonomous entities that travel on a same road with members of the vehicular micro cloud at least for a certain period of time (or at least for a certain distance).

For example, if there is a group of autonomous entities that can provide resources to the vehicular micro cloud, the autonomous entity route planner 148 may select one or more autonomous entities from the group based on one or more selection factors. The one or more selection factors may include, but are not limited to, one or more of the following: the resource demand of the vehicular micro cloud (e.g., more autonomous entities may be selected for a higher resource demand); a period of time that a particular autonomous entity is expected to remain in the vehicular micro cloud (e.g., selecting an autonomous entity that is expected to remain in the vehicular micro cloud for the longest period of time); a location coverage of the vehicular micro cloud (e.g., selecting an autonomous entity that is already within the location coverage of the vehicular micro cloud); and a travel requirement of the autonomous entity (e.g., selecting an autonomous entity such that its trajectory, its timetable or a combination thereof matches with the vehicular micro cloud most).

In some embodiments, the autonomous entity route planner 148 is operable to search for one or more alternative routes for the one or more autonomous entities based on one or more of: (1) the vehicular cloud information (e.g., the geo-location information of the vehicular micro cloud); (2) the vehicular resource information (e.g., the resource demand of the vehicular micro cloud); and (3) the travel requirement of each of the one or more autonomous entities. For example, the autonomous entity route planner 148 re-routes the one or more autonomous entities so that the one or more autonomous entities are incorporated into the vehicular micro cloud to be new members of the vehicular micro cloud. Meanwhile, one or more travel requirements of the one or more autonomous entities are also satisfied. In a further example, the one or more autonomous entities are re-routed to be physically present within a communication range of one or more other members of the vehicular micro cloud so that resources of the one or more autonomous entities become available to the one or more other members of the vehicular micro cloud.

In some embodiments, the autonomous entity route planner 148 re-routes the one or more autonomous entities to maximize a capability of the one or more autonomous entities to provide their resources to the vehicular micro cloud. For example, the one or more autonomous entities are re-routed in such a way to maximize a period of time (or a distance) that the one or more autonomous entities may stay within the vehicular micro cloud.

Alternatively, or additionally, the autonomous entity route planner 148 is operable to search for an alternative configuration for at least one of the one or more autonomous entities based on one or more of: (1) the vehicular cloud information; (2) the vehicular resource information; and (3) the travel requirement of the at least one of the one or more autonomous entities. For example, the one or more autonomous entities include at least an autonomous platoon. The autonomous entity route planner 148 may determine a reorganized configuration for the autonomous platoon so that the autonomous platoon after reorganization may contribute its resources to fulfill the resource demand of the vehicular micro cloud. In a further example, in order to offer an appropriate amount of resources to the vehicular micro cloud, the autonomous entity route planner 148 may split the autonomous platoon into two smaller autonomous platoons, merge the autonomous platoon with another autonomous platoon or invite new autonomous machines (e.g., new autonomous vehicles) to join the autonomous platoon, etc.

In some embodiments, the autonomous entity route planner 148 may adjust speeds of the one or more autonomous entities to maximize a capability of the one or more autonomous entities to provide their resources to the vehicular micro cloud.

The autonomous entity route planner 148 may generate a reorganization message that includes a reorganization instruction and may transmit the reorganization message to the external resource manager 193 of the reorganization client 199. The reorganization instruction may indicate to incorporate resources of the one or more autonomous entities into a resource pool of the vehicular micro cloud (e.g., incorporating the one or more autonomous entities as members of the vehicular micro cloud). The reorganization instruction may additionally indicate one or more of: (1) a re-routing of the one or more autonomous entities; and (2) a reorganized configuration for at least an autonomous platoon included in the one or more autonomous entities.

The autonomous entity route planner 148 may send reorganization data to the autonomous entity mobility manager 147, where the reorganization data describes a reorganization of the one or more autonomous entities and resources of the one or more autonomous entities that are provided to the vehicular micro cloud. The autonomous entity mobility manager 147 may forward the reorganization data to the cloud resource manager 141.

Turning to the reorganization client 199 again, the external resource manager 193 is operable to receive the reorganization message from the autonomous entity route planner 148 via the communication unit 145. The reorganization message may include one or more routes or re-routes for the one or more autonomous entities. The external resource manager 193 may inform the resource detector 195 about the resources provided by the one or more autonomous entities. The resource detector 195 may determine a list of available resources provided by the one or more autonomous entities and provide the list of available resources to the vehicle cloud manager 197 so that the vehicle cloud manager 197 may use the list of available resources for task execution or cloudification services in the vehicular micro cloud. In this way, the resource demand of the vehicular micro cloud may be fulfilled with the resources provided by the one or more autonomous entities.

In some embodiments, responsive to receiving the reorganization message that includes a reorganization instruction, the vehicle cloud manager 197 may execute the reorganization instruction to incorporate resources of the one or more autonomous entities into a resource pool of the vehicular micro cloud. As a result, the resource demand of the vehicular micro cloud is met. For example, the vehicle cloud manager 197 incorporates the one or more autonomous entities to be new members of the vehicular micro cloud so that the resources of the one or more autonomous entities become available to other members of the vehicular micro cloud while travel requirements of the one or more autonomous entities are also satisfied. The one or more autonomous entities are re-routed to be physically present within a communication range of the one or more other members of the vehicular micro cloud to provide their resources to the one or more other members.

In some examples, the one or more autonomous entities include an autonomous platoon that is reorganized to meet the resource demand of the vehicular micro cloud. For example, the autonomous platoon is split into two smaller autonomous platoons, merged with another autonomous platoon or joined by new autonomous vehicles in order to offer an appropriate amount of resources to the vehicular micro cloud.

FIGS. 1C-1D are graphical representations illustrating an example use case 170 of reorganizing autonomous entities to meet resource demands of vehicular micro clouds according to some embodiments. In a roadway environment depicted in FIGS. 1C-1D, an autonomous platoon 172, a first vehicular micro cloud 175, a second vehicular micro cloud 176 and multiple nodes 171A, 171B and 171C are shown. The multiple nodes 171A, 171B and 171C may represent one or more physical servers (e.g., the edge servers 140 or the cloud servers 160), roadside units, virtual entities (e.g., other vehicular micro clouds) or a combination thereof. Each of the multiple nodes 171A, 171B and 171C may be installed with an instance of the reorganization system 143.

In this example use case 170, the first vehicular micro cloud 175 includes a first cloud leader 177 and the second vehicular micro cloud 176 includes a second cloud leader 178. Each of the first cloud leader 177 and the second cloud leader 178 is installed with an instance of the reorganization client 199.

The reorganization client 199 of the first cloud leader 177 communicates with the node 171B to send a first request message to the node 171B. The first request message may include a first resource demand of the first vehicular micro cloud 175. The reorganization client 199 of the second cloud leader 178 communicates with the node 171C to send a second request message to the node 171C. The second request message may include a second resource demand of the second vehicular micro cloud 176.

The node 171B and the node 171C may communicate with the node 171A to forward the first request message and the second request message to the node 171A, respectively. The reorganization system 143 of the node 171A then communicates with the autonomous platoon 172 (e.g., a leader of the autonomous platoon 172) to reorganize the autonomous platoon 172 so that both the first resource demand of the first vehicular micro cloud 175 and the second resource demand of the second vehicular micro cloud 176 are met. For example, as depicted in FIG. 1C, the reorganization system 143 of the node 171A splits the autonomous platoon 172 into three autonomous platoons, including: an autonomous platoon 173 for the first vehicular micro cloud 175; an autonomous platoon 174 for the second vehicular micro cloud 176; and a remaining autonomous platoon 179.

Turning to FIG. 1D, the reorganization system 143 of the node 171A re-routes the autonomous platoon 173 to join the first vehicular micro cloud 175 so that resources of the autonomous platoon 173 become available in the first vehicular micro cloud 175 to meet the first resource demand of the first vehicular micro cloud 175. A travel requirement of the autonomous platoon 173 is also satisfied after joining the first vehicular micro cloud 175 (e.g., the autonomous platoon 173 can arrive at its destination within an expected arrival time).

The reorganization system 143 of the node 171A re-routes the autonomous platoon 174 to join the second vehicular micro cloud 176 so that resources of the autonomous platoon 174 become available in the second vehicular micro cloud 176 to meet the second resource demand of the second vehicular micro cloud 176. A travel requirement of the autonomous platoon 174 is also satisfied after joining the second vehicular micro cloud 176 (e.g., the autonomous platoon 174 can arrive at its destination no later than an expected arrival time).

Example Computer System

Figure 2:
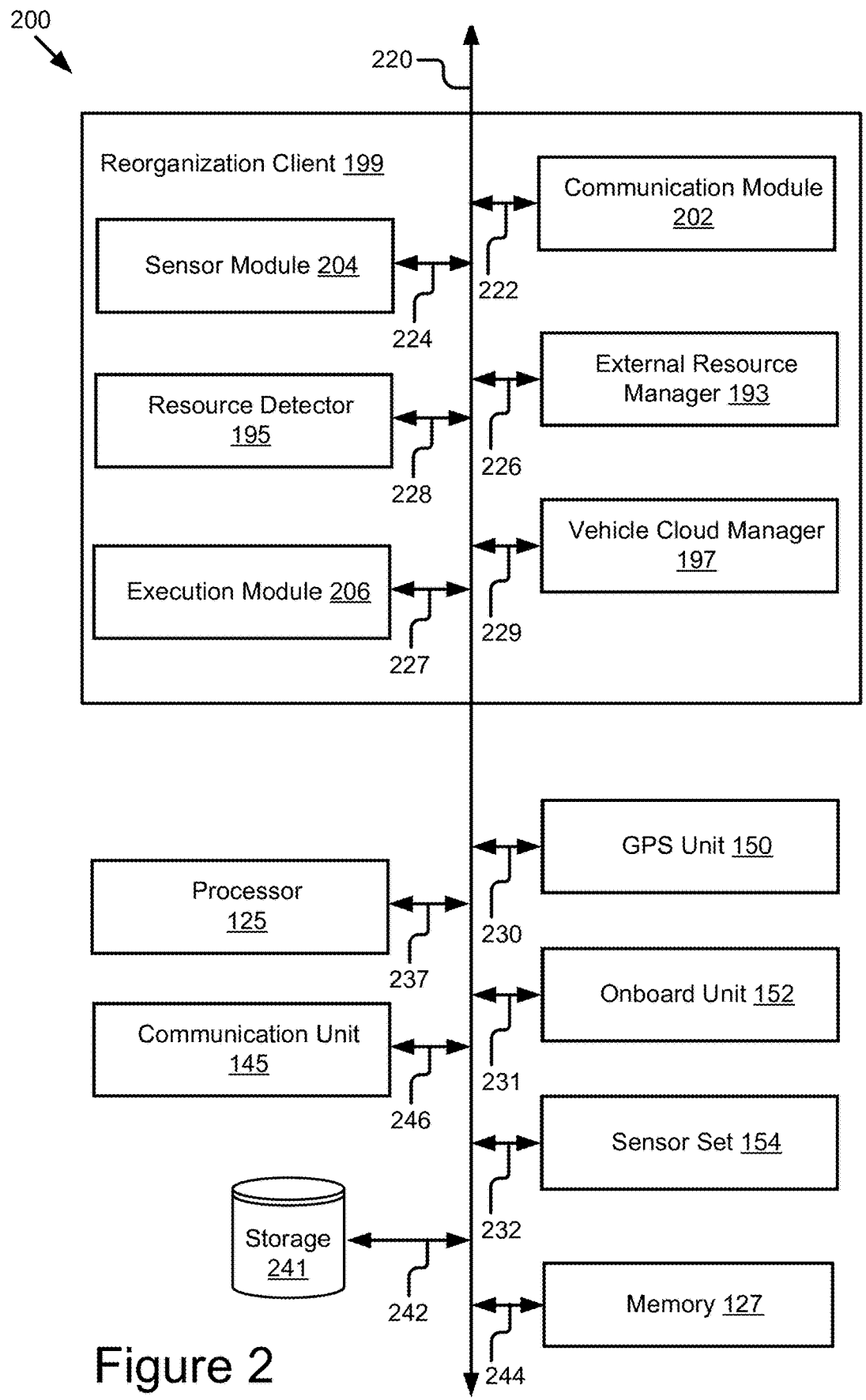
FIG. 2 is a block diagram illustrating an example computer system including the reorganization client according to some embodiments.

Referring now to FIG. 2, depicted is a block diagram illustrating an example computer system 200 including the reorganization client 199 according to some embodiments. In some embodiments, the computer system 200 may include a special-purpose computer system that is programmed to perform one or more steps of methods 300 and 500 described below with reference to FIGS. 3 and 5.

In some embodiments, the computer system 200 is an on-board vehicle computer of the vehicle 110. In some embodiments, the computer system 200 is an onboard unit of the vehicle 110. In some embodiments, the computer system 200 is an electronic control unit (ECU), head unit or some other processor-based computing device of the vehicle 110.

The computer system 200 may include one or more of the following elements according to some examples: the reorganization client 199; the processor 125; the memory 127; the communication unit 145; the GPS unit 150; the onboard unit 152; the sensor set 154; and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The GPS unit 150 is communicatively coupled to the bus 220 via a signal line 230. The onboard unit 152 is communicatively coupled to the bus 220 via a signal line 231. The sensor set 154 is communicatively coupled to the bus 220 via a signal line 232. The storage 241 is communicatively coupled to the bus 220 via a signal line 242. The memory 127 is communicatively coupled to the bus 220 via a signal line 244.

The processor 125, the memory 127, the communication unit 145, the GPS unit 150, the onboard unit 152 and the sensor set 154 are described above with reference to FIG. 1A, and so, similar description will not be repeated here. The memory 127 may store any of the data described above with reference to FIGS. 1A-1D. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the reorganization client 199 includes: a communication module 202; a sensor module 204; the external resource manager 193; the resource detector 195; the vehicle cloud manager 197; and an execution module 206. These components of the reorganization client 199 are communicatively coupled to each other via the bus 220. In some embodiments, components of the reorganization client 199 can be stored in a single device. In some other embodiments, components of the reorganization client 199 can be distributed and stored across multiple devices.

The communication module 202 can be software including routines for handling communications between the reorganization client 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. The communication module 202 may send or receive any of the data or messages described above with reference to FIGS. 1A-1D via the communication unit 145.

In some embodiments, the communication module 202 receives data from components of the reorganization client 199 and stores the data in one or more of the storage 241 and the memory 127. For example, the communication module 202 receives data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the reorganization client 199. For example, the communication module 202 may handle communications among the sensor module 204, the external resource manager 193, the resource detector 195, the vehicle cloud manager 197 and the execution module 206. Any of these systems or modules may cause the communication module 202 to communicate with the other elements of the computer system 200 or the operating environment 100 (via the communication unit 145).

In some embodiments, the sensor module 204 can be software including routines for recording sensor data associated with the vehicle 110. In some embodiments, the sensor module 204 can be a set of instructions stored in the memory 127 of the computer system 200 and can be accessible and executable by the processor 125. The sensor module 204 may be adapted for cooperation and communication with the processor 125 and other components of the computer system 200 via a signal line 224.

In some embodiments, the sensor module 204 causes one or more sensors of the sensor set 154 to record sensor data describing a roadway environment of the vehicle 110. The sensor module 204 receives the sensor data from the one or more sensors. Alternatively, or additionally, the sensor module 204 of the vehicle 110 may receive sensor data recorded by another endpoint located in the roadway environment via a V2X message generated by the other endpoint. The other endpoint may be, for example, another vehicle 110, a roadside unit or any other infrastructure device in the roadway environment. The sensor module 204 may send the sensor data to the resource detector 195 and the vehicle cloud manager 197.

The external resource manager 193 can be software including routines that, when executed by the processor 125, cause the processor 125 to inform the resource detector 195 and the vehicle cloud manager 197 about resources provided by autonomous entities. In some embodiments, the external resource manager 193 can be a set of instructions stored in the memory 127 of the computer system 200 and can be accessible and executable by the processor 125. The external resource manager 193 may be adapted for cooperation and communication with the processor 125 and other components of the computer system 200 via a signal line 226.

The external resource manager 193 is described above with reference to FIG. 1B, and so, similar description will not be repeated here.

The resource detector 195 can be software including routines that, when executed by the processor 125, cause the processor 125 to monitor resources available on the vehicle 110 or resources provided by autonomous entities. In some embodiments, the resource detector 195 can be a set of instructions stored in the memory 127 of the computer system 200 and can be accessible and executable by the processor 125. The resource detector 195 may be adapted for cooperation and communication with the processor 125 and other components of the computer system 200 via a signal line 228.

The resource detector 195 is described above with reference to FIG. 1B, and so, similar description will not be repeated here.

The vehicle cloud manager 197 can be software including routines that, when executed by the processor 125, cause the processor 125 to manage a vehicular micro cloud. In some embodiments, the vehicle cloud manager 197 can be a set of instructions stored in the memory 127 of the computer system 200 and can be accessible and executable by the processor 125. The vehicle cloud manager 197 may be adapted for cooperation and communication with the processor 125 and other components of the computer system 200 via a signal line 229.

The vehicle cloud manager 197 is described above with reference to FIG. 1B, and so, similar description will not be repeated here. The vehicle cloud manager 197 is also described below with reference to FIGS. 3 and 5.

The execution module 206 can be software including routines that, when executed by the processor 125, cause the processor 125 to execute a reorganization instruction to meet a resource requirement of the vehicle 110. In some embodiments, the execution module 206 can be a set of instructions stored in the memory 127 of the computer system 200 and can be accessible and executable by the processor 125. The execution module 206 may be adapted for cooperation and communication with the processor 125 and other components of the computer system 200 via a signal line 227.

In some embodiments, the execution module 206 receives, via a V2X network, a reorganization message that includes a reorganization instruction to fulfill a resource requirement of the vehicle 110. The execution module 206 may execute the reorganization instruction to re-route the vehicle 110 based on a route provided by the reorganization instruction so that the resource requirement of the vehicle 110 is satisfied. For example, the execution module 206 may modify an operation of a vehicle control system (e.g., an ADAS system or an autonomous driving system) of the vehicle 110 to re-route the vehicle 110 based on a route provided by the reorganization instruction. The execution module 206 is also described below with reference to FIG. 5.

Example Processes

Referring now to FIG. 3, depicted is a flowchart of an example method 300 for managing a resource demand of a vehicular micro cloud on a connected vehicle according to some embodiments. The steps of the method 300 are executable in any order, and not necessarily the order depicted in FIG. 3. The method 300 can be performed by a connected vehicle (e.g., the vehicle 110).

At step 301, the vehicle cloud manager 197 determines vehicular cloud information that describes a vehicular micro cloud. The connected vehicle can be a member of the vehicular micro cloud.

At step 303, the vehicle cloud manager 197 determines a resource demand of the vehicular micro cloud.

At step 305, the vehicle cloud manager 197 modifies an operation of the communication unit 145 of the connected vehicle to transmit, via a V2X network, a request message that includes the vehicular cloud information and the resource demand of the vehicular micro cloud.

At step 307, the vehicle cloud manager 197 modifies the operation of the communication unit 145 of the connected vehicle to receive, via the V2X network, a reorganization message that includes a reorganization instruction to fulfill the resource demand of the vehicular micro cloud.

At step 309, the vehicle cloud manager 197 executes the reorganization instruction for the vehicular micro cloud to incorporate one or more resources of an autonomous entity into a resource pool of the vehicular micro cloud so that the resource demand of the vehicular micro cloud is met. For example, the vehicle cloud manager 197 incorporates the autonomous entity to be a new member of the vehicular micro cloud so that the one or more resources of the autonomous entity become available to one or more other members of the vehicular micro cloud. Meanwhile, a travel requirement of the autonomous entity is also satisfied.

In some embodiments, the autonomous entity is re-routed to be physically present within a communication range of the one or more other members of the vehicular micro cloud to provide its resources to the one or more other members. In some embodiments, the autonomous entity includes an autonomous platoon that is reorganized to meet the resource demand of the vehicular micro cloud.

In some embodiments, the autonomous entity is selected to join the vehicular micro cloud based on one or more selection factors. For example, the one or more selection factors include one or more of the following: the resource demand of the vehicular micro cloud; a period of time that the autonomous entity is expected to remain in the vehicular micro cloud; a location coverage of the vehicular micro cloud; and the travel requirement of the autonomous entity.

In some embodiments, a travel path of the autonomous entity is dynamically adjusted to provide its resources to the vehicular micro cloud based on one or more of the resource demand of the vehicular micro cloud and the travel requirement of the autonomous entity. For example, on a premise of meeting the travel requirement of the autonomous entity (e.g., a guarantee that the autonomous entity may arrive at its destination within an expected arrival time), the vehicle cloud manager 197 initially instructs the autonomous entity to follow a first member of the vehicular micro cloud to facilitate a provisioning of its resources to the first member for a task execution. Responsive to a completion of the task execution, the vehicle cloud manager 197 may adjust a travel path of the autonomous entity to follow a second member of the vehicular micro cloud to facilitate the provisioning of its resources to the second member for another task execution.

In some embodiments, a speed of the autonomous entity is adjusted to maximize a capability of the autonomous entity to provide its resources to the vehicular micro cloud. For example, on a premise of meeting the travel requirement of the autonomous entity, a speed of the autonomous entity may be reduced to follow a speed of a cloud leader of the vehicular micro cloud so that the autonomous entity can stay in the vehicular micro cloud as long as possible.

Figure 4A:
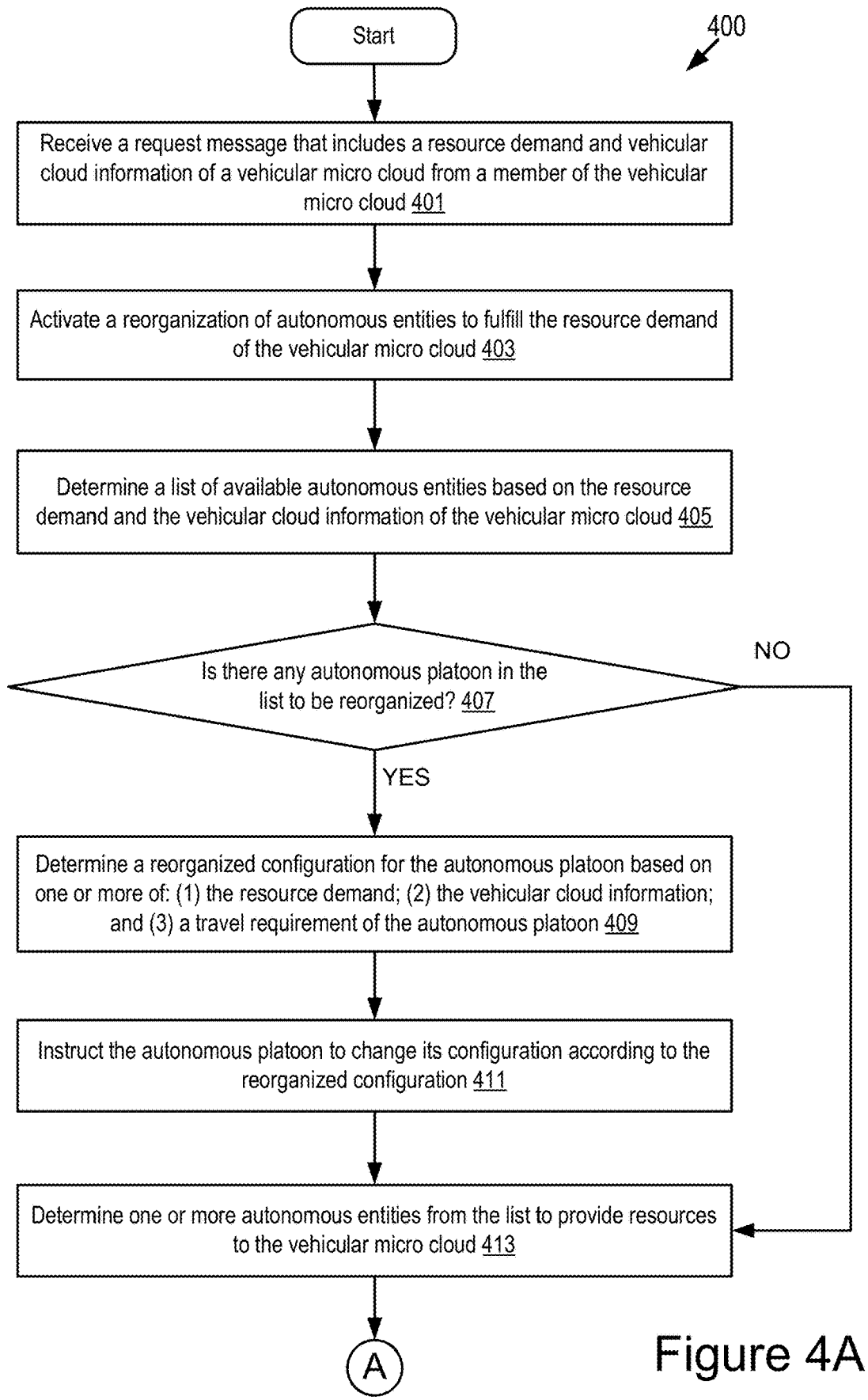
FIGS. 4A-4B depict a method for reorganizing one or more autonomous entities to meet a resource demand of a vehicular micro cloud according to some embodiments.
Figure 4B:
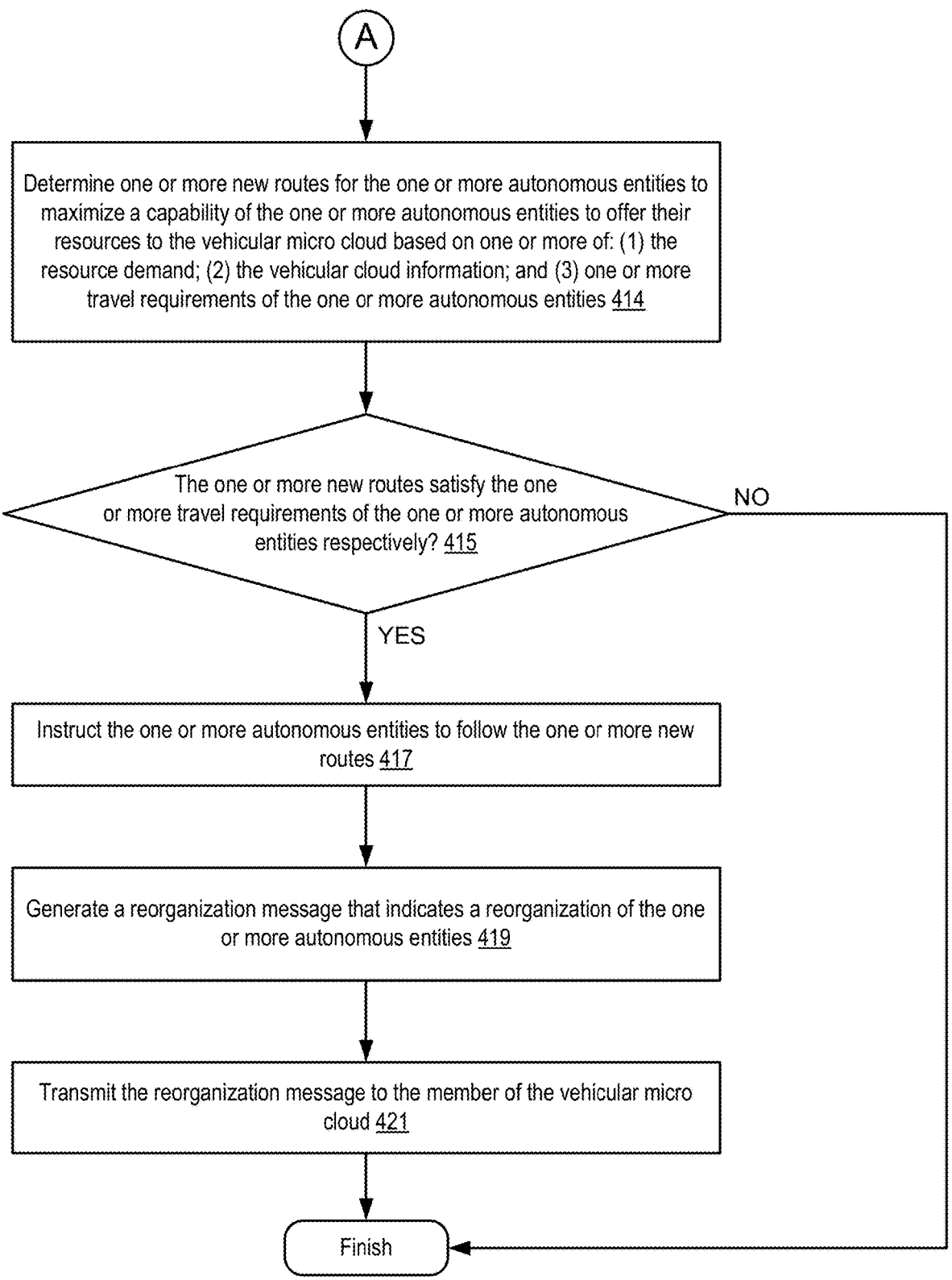

FIGS. 4A-4B depict a method 400 for reorganizing one or more autonomous entities to meet a resource demand of a vehicular micro cloud according to some embodiments. The steps of the method 400 are executable in any order, and not necessarily the order depicted in FIGS. 4A-4B. The method 400 can be performed by the edge server 140 or the cloud server 160.

Referring to FIG. 4A, at step 401, the cloud mobility manager 142 and the cloud resource manager 141 receives a request message that includes a resource demand and vehicular cloud information of a vehicular micro cloud from a member of the vehicular micro cloud.

At step 403, the cloud mobility manager 142 or the cloud resource manager 141 activates a reorganization of autonomous entities to fulfill the resource demand of the vehicular micro cloud. For example, the cloud mobility manager 142 or the cloud resource manager 141 instructs the autonomous entity mobility manager 147 and the autonomous entity route planner 148 to coordinate the reorganization of autonomous entities (e.g., re-routing autonomous entities, reorganizing configurations of autonomous entities or a combination thereof).

At step 405, the autonomous entity route planner 148 determines a list of available autonomous entities based on the resource demand and the vehicular cloud information of the vehicular micro cloud. For example, the list of available autonomous entities may include various autonomous entities that are located within a service area of the edge server 140 or the cloud server 160 where the reorganization system 143 is installed.

At step 407, the autonomous entity route planner 148 determines whether there is any autonomous platoon in the list to be reorganized. If there is an autonomous platoon (e.g., the autonomous platoon may be one of the autonomous entities in the list), the method 400 moves to step 409. Otherwise, the method 400 moves to step 413.

At step 409, the autonomous entity route planner 148 determines a reorganized configuration for the autonomous platoon based on one or more of: (1) the resource demand; (2) the vehicular cloud information; and (3) a travel requirement of the autonomous platoon.

At step 411, the autonomous entity route planner 148 instructs the autonomous platoon to change its configuration according to the reorganized configuration. For example, the autonomous entity route planner 148 can split the autonomous platoon into two autonomous platoons, merge the autonomous platoon with another autonomous platoon or invite new autonomous machines to join the autonomous platoon.

At step 413, the autonomous entity route planner 148 determines one or more autonomous entities from the list to provide resources to the vehicular micro cloud. In some embodiments, the one or more autonomous entities may include the autonomous platoon that is reorganized according to the reorganized configuration.

Referring to FIG. 4B, at step 414, the autonomous entity route planner 148 determines one or more new routes for the one or more autonomous entities to maximize a capability of the one or more autonomous entities to offer their resources to the vehicular micro cloud based on one or more of: (1) the resource demand; (2) the vehicular cloud information; and (3) one or more travel requirements of the one or more autonomous entities.

At step 415, the autonomous entity route planner 148 determines whether the one or more new routes satisfy the one or more travel requirements of the one or more autonomous entities respectively. Responsive to the one or more new routes satisfying the one or more travel requirements (e.g., the one or more new routes allowing the one or more autonomous entities to arrive at their destinations within expected arrival times), the method 400 moves to step 417. Otherwise, the method 400 ends.

At step 417, the autonomous entity route planner 148 instructs the one or more autonomous entities to follow the one or more new routes. For example, the one or more autonomous entities are re-routed based on the one or more new routes to be physically present within a communication range of one or more other members of the vehicular micro cloud so that resources of the one or more autonomous entities are accessible by the one or more other members.

At step 419, the autonomous entity route planner 148 generates a reorganization message that indicates a reorganization of the one or more autonomous entities. The reorganization message may include a reorganization instruction that indicates a re-routing of the one or more autonomous entities, a reorganized configuration of an autonomous platoon within the one or more autonomous entities or a combination thereof. In some embodiments, the autonomous entity route planner 148 also informs the path planner 146, the cloud resource manager 141 and the cloud mobility manager 142 about the reorganization of the one or more autonomous entities.

At step 421, the autonomous entity route planner 148 transmits the reorganization message to the member of the vehicular micro cloud.

Responsive to receiving the reorganization message at the member of the vehicular micro cloud, the reorganization client 199 of the member may execute the reorganization instruction to incorporate resources of the one or more autonomous entities into a resource pool of the vehicular micro cloud so that the resource demand of the vehicular micro cloud can be met.

FIG. 5 depicts a method 500 for managing a resource requirement of a connected vehicle according to some embodiments. The steps of the method 500 are executable in any order, and not necessarily the order depicted in FIG. 5. The method 500 can be performed by a connected vehicle (e.g., the vehicle 110).

At step 501, the sensor module 204 generates sensor data describing sensor measurements of the connected vehicle such as a location, a speed, a heading, a route destination, and an expected arrival time at the route destination.

At step 503, the vehicle cloud manager 197 determines requirement data that is digital data describing a resource requirement from a vehicular micro cloud by the connected vehicle.

At step 505, the vehicle cloud manager 197 transmits, via a V2X network, a request message to the reorganization system 143 that describes the sensor data and the resource requirement of the connected vehicle. The request message includes the sensor data and the requirement data as its payload.

At step 507, the execution module 206 receives, via the V2X network, a reorganization message that includes a reorganization instruction to fulfill the resource requirement of the connected vehicle.

At step 509, the execution module 206 executes the reorganization instruction to re-route the connected vehicle based on a route provided by the reorganization instruction so that the resource requirement of the connected vehicle is satisfied.

Figure 6:
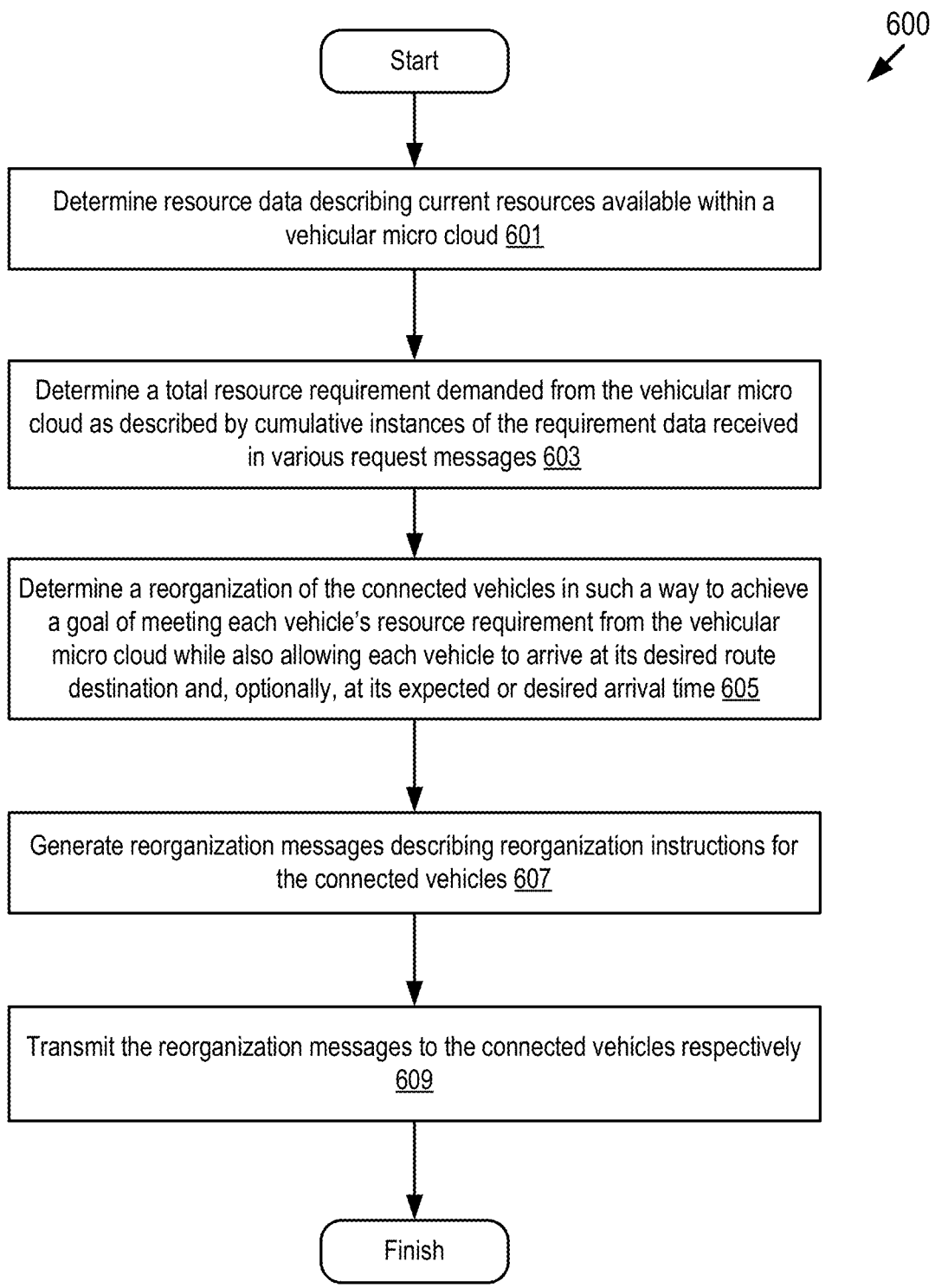
FIG. 6 depicts a method for reorganizing connected vehicles to meet respective resource requirements of the connected vehicles according to some embodiments.

FIG. 6 depicts a method 600 for reorganizing connected vehicles to satisfy respective resource requirements of the connected vehicles according to some embodiments. The steps of the method 600 are executable in any order, and not necessarily the order depicted in FIG. 6. The method 600 can be performed by the edge server 140 or the cloud server 160.

At step 601, the reorganization system 143 determines resource data describing current resources available within a vehicular micro cloud.

At step 603, the reorganization system 143 determines a total resource requirement demanded from the vehicular micro cloud as described by cumulative instances of the requirement data received in various request messages from various connected vehicles.

At step 605, the reorganization system 143 determines a reorganization of the connected vehicles in such a way to achieve a goal of meeting each vehicle's resource requirement from the vehicular micro cloud while also allowing each vehicle to arrive at its desired route destination and, optionally, at its expected or desired arrival time.

At step 607, the reorganization system 143 generates reorganization messages describing reorganization instructions for the connected vehicles.

At step 609, the reorganization system 143 transmits the reorganization messages to the connected vehicles respectively.

For example, each reorganization message may include a respective reorganization instruction for a corresponding connected vehicle. Upon an execution of the respective reorganization instruction on the corresponding connected vehicle, the corresponding connected vehicle may be routed or re-routed based on a route provided by the reorganization instruction so that the resource requirement of the corresponding connected vehicle is satisfied.

In some embodiments, the connected vehicles are organized into autonomous platoons, and the reorganization system 143 routes or re-routes entire autonomous platoons to meet the resource demand of the vehicular micro cloud or the expected future resource demand of the vehicular micro cloud.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory of an onboard vehicle computer system of a vehicle storing computer-executable code that, when executed by a processor, causes the processor to:
   determine a set of available autonomous entities included in a vehicular micro cloud;
   modify an operation of a communication unit of the vehicle to receive, via a Vehicle-to-Everything (V2X) network, a reorganization message that includes a reorganization instruction to fulfill a resource demand of the vehicular micro cloud;
   select an autonomous entity to join the vehicular micro cloud based on one or more selection factors that include one or more of: the resource demand of the vehicular micro cloud, a period of time that the autonomous entity is expected to remain in the vehicular micro cloud, or a travel requirement of the autonomous entity; and
   execute the reorganization instruction to incorporate one or more resources of the autonomous entity into a resource pool of the vehicular micro cloud so that the resource demand of the vehicular micro cloud is met,
   wherein the autonomous entity is re-routed to be physically present within a communication range of one or more other members of the vehicular micro cloud so that the one or more resources of the autonomous entity are accessible by the one or more other members.

2. The computer program product of claim 1, wherein the autonomous entity was selected to join the vehicular micro cloud based on one or more selection factors that include one or more of: the resource demand of the vehicular micro cloud, a period of time that the autonomous entity is expected to remain in the vehicular micro cloud, or a travel requirement of the autonomous entity.

3. The computer program product of claim 1, wherein the autonomous entity includes an autonomous platoon that is reorganized to meet the resource demand of the vehicular micro cloud.

4. A method for a vehicle that is a member of a vehicular micro cloud, comprising:
   determining a set of available autonomous entities included in a vehicular micro cloud;
   modifying an operation of a communication unit of the vehicle to receive, via a Vehicle-to-Everything (V2X) network, a reorganization message that includes a reorganization instruction to fulfill a resource demand of the vehicular micro cloud;
   selecting an autonomous entity to join the vehicular micro cloud based on one or more selection factors that include one or more of: the resource demand of the vehicular micro cloud, a period of time that the autonomous entity is expected to remain in the vehicular micro cloud, or a travel requirement of the autonomous entity; and
   executing the reorganization instruction to incorporate one or more resources of the autonomous entity into a resource pool of the vehicular micro cloud so that the resource demand of the vehicular micro cloud is met,
   wherein the autonomous entity is re-routed to be physically present within a communication range of one or more other members of the vehicular micro cloud so that the one or more resources of the autonomous entity are accessible by the one or more other members.

5. The method of claim 4, wherein executing the reorganization instruction to incorporate the one or more resources of the autonomous entity into the resource pool of the vehicular micro cloud comprises:
   incorporating the autonomous entity to be a new member of the vehicular micro cloud so that the one or more resources become available to one or more other members of the vehicular micro cloud while the travel requirement of the autonomous entity is also satisfied.

6. The method of claim 5, wherein the autonomous entity is re-routed to be physically present within a communication range of the one or more other members of the vehicular micro cloud to provide the one or more resources to the one or more other members.

7. The method of claim 4, wherein the travel requirement specifies one or more of a destination or a travel time constraint of the autonomous entity.

8. The method of claim 4, wherein the autonomous entity includes an autonomous platoon that is reorganized to meet the resource demand of the vehicular micro cloud.

9. The method of claim 4, wherein a travel path of the autonomous entity is dynamically adjusted to provide the one or more resources to the vehicular micro cloud based on one or more of the resource demand of the vehicular micro cloud and the travel requirement of the autonomous entity.

10. The method of claim 4, wherein a speed of the autonomous entity is adjusted to maximize a capability of the autonomous entity to provide the one or more resources to the vehicular micro cloud.

11. The method of claim 4, wherein executing the reorganization instruction further comprises:
    modifying an operation of a vehicle control system of the vehicle to re-route the vehicle based on a route provided by the reorganization instruction so that a resource requirement of the vehicle is satisfied.

12. The method of claim 4, wherein prior to receiving the reorganization message, the method further comprises:
    determining vehicular cloud information that describes the vehicular micro cloud;
    determining the resource demand of the vehicular micro cloud; and
    determining the set of available autonomous entities based on the resource demand and the vehicular cloud information, wherein the autonomous entity is selected from the set of available autonomous entities.

13. A system of a connected vehicle that is a member of a vehicular micro cloud, comprising:
    a processor; and
    a non-transitory memory storing computer code which, when executed by the processor, causes the processor to:
       determine a set of available autonomous entities included in a vehicular micro cloud;
       modify an operation of a communication unit of the connected vehicle to receive, via a Vehicle-to-Everything (V2X) network, a reorganization message that includes a reorganization instruction to fulfill a resource demand of the vehicular micro cloud;
       select an autonomous entity to join the vehicular micro cloud based on one or more selection factors that include one or more of: the resource demand of the vehicular micro cloud, a period of time that the autonomous entity is expected to remain in the vehicular micro cloud, or a travel requirement of the autonomous entity; and execute the reorganization instruction to incorporate one or more resources of an autonomous entity into a resource pool of the vehicular micro cloud so that the resource demand of the vehicular micro cloud is met;

wherein the autonomous entity is re-routed to be physically present within a communication range of one or more other members of the vehicular micro cloud so that the one or more resources of the autonomous entity are accessible by the one or more other members.

14. The system of claim 13, wherein the computer code, when executed by the processor, causes the processor to execute the reorganization instruction to incorporate the one or more resources of the autonomous entity into the resource pool of the vehicular micro cloud at least by:

incorporating the autonomous entity to be a new member of the vehicular micro cloud so that the one or more resources become available to one or more other members of the vehicular micro cloud while the travel requirement of the autonomous entity is also satisfied.

15. The system of claim 14, wherein the autonomous entity is re-routed to be physically present within a communication range of the one or more other members of the vehicular micro cloud to provide the one or more resources to the one or more other members.

16. The system of claim 14, wherein the travel requirement specifies one or more of a destination or a travel time constraint of the autonomous entity.

17. The system of claim 13, wherein the autonomous entity includes an autonomous platoon that is reorganized to meet the resource demand of the vehicular micro cloud.

18. The system of claim 13, wherein a travel path of the autonomous entity is dynamically adjusted to provide the one or more resources to the vehicular micro cloud based on one or more of the resource demand of the vehicular micro cloud and the travel requirement of the autonomous entity.

19. The system of claim 13, wherein a speed of the autonomous entity is adjusted to maximize a capability of the autonomous entity to provide the one or more resources to the vehicular micro cloud.

20. The system of claim 13, wherein prior to receiving the reorganization message, the computer code, when executed by the processor, causes the processor to:

determine vehicular cloud information that describes the vehicular micro cloud;

determine the resource demand of the vehicular micro cloud; and determining the set of available autonomous entities based on the resource demand and the vehicular cloud information, wherein the autonomous entity is selected from the set of available autonomous entities.

* * * * *